(12) United States Patent
Derom (10) Patent No.: US 10,061,010 B2
(45) Date of Patent: Aug. 28, 2018

(54) DISTANCE MEASUREMENT

(71) Applicant: NXP B.V., Eindhoven (NL)

(72) Inventor: Koen Derom, Leuven (BE)

(73) Assignee: NXP B.V., Eindhoven (NL)

( * ) Notice: Subject to any disclaimer, the term of this patent is extended or adjusted under 35 U.S.C. 154(b) by 323 days.

(21) Appl. No.: 14/747,508

(22) Filed: Jun. 23, 2015

(65) Prior Publication Data

US 2016/0025836 A1    Jan. 28, 2016

(30) Foreign Application Priority Data

Jul. 25, 2014 (EP) ..................................... 14178605

(51) Int. Cl.
*G01S 3/808* (2006.01)
*G01S 15/08* (2006.01)
(Continued)

(52) U.S. Cl.
CPC .............. *G01S 3/808* (2013.01); *G01S 15/08* (2013.01); *G01S 15/104* (2013.01); *H04B 11/00* (2013.01)

(58) Field of Classification Search
CPC ........ G01S 3/808; G01S 15/104; G01S 15/08; H04B 11/00; B60C 7/14; B60C 7/18; B60C 7/20
(Continued)

(56) References Cited

U.S. PATENT DOCUMENTS 3,004,707 A * 10/1961 Wilson .................... G01S 13/70
                                                     342/175

4,199,246 A    4/1980 Muggli
(Continued)

FOREIGN PATENT DOCUMENTS

CN        102540191 A     1/2012
EP        2 271 134 A1    1/2011
(Continued)

OTHER PUBLICATIONS

Office Action from Counterpart application CN 201510441692.8; 8 pages (dated Apr. 5, 2017).
(Continued)

*Primary Examiner* — Isam A Alsomiri
*Assistant Examiner* — Amie M Ndure (57) ABSTRACT

A method for determining a distance between a device and an object, the method comprising: emitting an acoustic reference signal from a speaker of the device; receiving an acoustic input signal at a microphone of the device, the acoustic input signal including a measurement portion including a reflection of the acoustic reference signal off the object; cross correlating at least the measurement portion with the emitted acoustic reference signal to provide a cross correlated signal; receiving information relating to the object; extracting a section of the cross correlated signal corresponding to reflection of the acoustic reference signal by the object, based on the received information; analyzing the extracted section of the cross correlated signal to determine a time of flight between emitting the acoustic reference signal and receiving the reflection; and determining the distance between the device and the object based on the determined time of flight and known characteristics of the acoustic reference signal. A chipset for performing the method is also disclosed.

16 Claims, 6 Drawing Sheets

(51) Int. Cl.
*G01S 15/10* (2006.01)
*H04B 11/00* (2006.01)

(58) Field of Classification Search
USPC .......................................... 367/96, 107, 99
See application file for complete search history.

(56) References Cited

U.S. PATENT DOCUMENTS

| | | | |
|---|---|---|---|
| 4,910,717 A * | 3/1990 | Terry .................. | G01S 7/52006 367/910 |
| 6,480,266 B2 | 11/2002 | Shirai et al. | |
| 6,988,026 B2 * | 1/2006 | Breed ...................... | G07C 5/008 701/31.4 |
| 7,103,460 B1 * | 9/2006 | Breed ................... | B60C 23/0408 701/29.1 |
| 7,164,117 B2 * | 1/2007 | Breed .............. | B60R 21/01516 250/208.1 |
| 7,724,355 B1 * | 5/2010 | McIntosh .............. | G01S 15/104 356/28 |
| 9,152,276 B2 * | 10/2015 | Dahl ........................ | G06F 3/043 |
| 9,452,023 B2 * | 9/2016 | Boillot ................... | A61B 8/565 |
| 9,689,958 B1 * | 6/2017 | Wild ...................... | G01S 3/8003 |
| 9,711,038 B1 * | 7/2017 | Pennebaker, III ...... | G08C 17/02 |
| 9,720,505 B2 * | 8/2017 | Gribetz .................. | G06F 3/017 |
| 9,781,575 B1 * | 10/2017 | Wan ....................... | H04W 4/04 |
| 2002/0111171 A1 * | 8/2002 | Boesch ................. | G01S 5/0027 455/456.5 |
| 2004/0215382 A1 * | 10/2004 | Breed ..................... | B60C 11/24 701/45 |
| 2004/0253994 A1 | 12/2004 | Lampl et al. | |
| 2005/0001720 A1 * | 1/2005 | Mason ................. | G01C 21/206 340/539.13 |
| 2005/0192727 A1 * | 9/2005 | Shostak ................. | B60C 11/24 701/37 |
| 2005/0255874 A1 * | 11/2005 | Stewart-Baxter ... | H04M 1/6075 455/550.1 |
| 2006/0025897 A1 * | 2/2006 | Shostak ................ | B60C 23/005 701/1 |
| 2006/0044140 A1 * | 3/2006 | Berg ....................... | A61F 11/08 340/573.1 |
| 2006/0212193 A1 * | 9/2006 | Breed ................. | B60C 23/0425 701/33.7 |
| 2008/0252595 A1 | 10/2008 | Boillot | |
| 2015/0110298 A1 | 4/2015 | MacOurs et al. | |

FOREIGN PATENT DOCUMENTS

| | | | |
|---|---|---|---|
| EP | 2271134 A1 * | 1/2011 | ............ G01S 15/06 |
| GB | 1 464 42 | 2/1977 | |

OTHER PUBLICATIONS

Otto, Tobias; "Principle of FMCW Radar"; TuDelft University; 21 pages.
U.S. Appl. No. 14/454,110, (dated Aug. 7, 2014).
Extended European Search Report for application 14178605.3 (dated Jan. 15, 2015).
Wen-tao, Wu; "Group and Phase Delay Estimation for Narrowband Signals Based on Quadratic Phase System Model"; Technical Acoustics, vol. 29, No. 6, Pt. 2; 2 pages (Dec. 2010)—No translation available.
Songling, Huant; "Novel Electromagnetic Nondestructive Testing Technology": Tsinghua University Press; 3 pages (Jan. 1, 2014)—No translation available.
Wan-cheng, GE; "Signal Processing in Correlation Based Robust Ultrasonic Distance Measurement"; J. of Tongh University, vol. 30, No. 1; 6 pages (Jan. 2002)—No translation available.
Office Action; CN appln 2015/10441691.8; 19 pages (dated Dec. 27, 2017).

* cited by examiner

DISTANCE MEASUREMENT

CROSS-REFERENCE TO RELATED APPLICATIONS

This application claims the priority under 35 U.S.C. § 119 of European patent application no. 14178605.3, filed Jul. 25, 2015 the contents of which are incorporated by reference herein.

FIELD

The present invention relates to a method of determining a distance between a device and an object. In particular, but not exclusively, the invention relates to using ultrasound to measure distances using a mobile communications device and to a chipset for enabling a mobile communications device to use ultrasound to measure distances.

BACKGROUND

For many applications of mobile communication devices (for example mobile phones, PDAs, tablet computers etc.) it is desirable to measure the distance between the device and an object. However, it is also important that mobile communication devices are small, lightweight and consume as little power as possible, and applications that require additional components, significant power or significant processing resources (which also consume power) are not desirable.

SUMMARY

According to a first aspect of the invention, there is provided a method as claimed in claim 1.

The method is advantageous because it can be implemented with a standard microphone and speaker of a mobile communication device.

It also reduces processing requirements because only a small part of a received signal needs to be analysed. The slower speed of propagation of sound waves compared to light waves also reduces power because processing requirements are low and low power is required to generate reference signals. The reference signals used also provide a high degree of accuracy because the reference signal exhibits good auto correlation properties.

Optionally, emitting the acoustic reference signal may comprise mixing the acoustic reference signal with a primary acoustic signal to be emitted by the speaker to form a mixed signal; and emitting the mixed signal. This allows the method to be employed at the same time as the speaker and microphone are used for other purposes, for example voice communications.

The primary acoustic signal may be audible.

The acoustic reference signal may be inaudible.

The acoustic reference signal may be pulsed or continuous and the known characteristics of the acoustic reference signal may comprise one or more of: a constant frequency or frequency sweep details; a signal loudness; a pulse duration; and an exact form of the signal.

Optionally, the method may comprise processing the acoustic signal to extract the measurement portion. Processing the acoustic input signal to extract the measurement portion may comprise: filtering the acoustic input signal to identify regions of the acoustic input signal having similar characteristics to the acoustic reference signal; and extracting these regions as the measurement portion.

One or more of the characteristics of the acoustic reference signal may be controlled based on the received information relating to the object. In this way, the method can optimised for different size and types of object and for objects different distances away.

The information relating to the object may comprise information enabling determination of an approximate arrival time of the reflection of the acoustic reference signal off the object, after emission of the acoustic reference signal at a first time.

Extracting a section of the cross correlated signal corresponding to reflection of the acoustic reference signal by the object may comprise: extracting a section of the cross correlated signal corresponding to a section of the acoustic input signal received during a time window centred at the approximate arrival time.

Analysing the extracted section of the cross correlated signal to determine the time of flight may comprise: rectifying the extracted section of the cross correlated signal to provide a rectified signal; detecting a centre of gravity of the rectified signal; determining the time of the centre of gravity; and determining the time difference between the time of the centre of gravity and a first time at which the acoustic reference signal was emitted. The centre of gravity parameter provides a highly stable parameter that is not heavily influenced by noise.

Detecting a centre of gravity of the rectified signal may comprise: filtering the rectified signal to remove high frequency noise and determine a correlation amplitude envelope, wherein detecting a centre of gravity comprises detecting a centre of gravity of the correlation amplitude envelope.

Alternatively, analysing the extracted section of the cross correlated signal to determine the time of flight may comprise: detecting a peak of the correlation in the extracted section of the signal; determining the time of the peak; and determining the time difference between the time of the peak and a first time at which the acoustic reference signal was emitted.

Detecting a peak of the extracted section of the cross correlated signal may comprise one or more of: rectifying the cross correlated signal; and filtering the cross correlated signal to remove high frequency noise and determine a cross correlation amplitude envelope.

The method may further comprise: determining an uncorrected time of flight as the time difference between the time of the centre of gravity or peak and a time at which the acoustic reference signal was emitted; and determining the time of flight as the uncorrected time of flight less a systematic delay.

The measurement portion may comprise a component corresponding to direct coupling from the speaker to the microphone wherein the method may further comprise: removing the component corresponding to direct coupling from the measurement portion.

The information relating to the object may be received from a user input at a user interface of the device.

The user input may confirm the object on a display of the device or may indicate an approximate distance to the object.

The method may further comprise: autofocussing a camera of the device on a candidate object; displaying the image captured by the camera on a screen of the device; receiving confirmation that the candidate object is the desired object; and receiving an estimate of the distance from the device to the candidate object, for example, based on autofocus parameters The device may be a mobile communication device and the speaker and microphone may be primarily for voice communication via the device. The method may further comprise: controlling at least one behaviour of the device based on the determined distance.

The at least one behaviour may comprise: the volume of audible sounds emitted by the device; the zoom of the screen on the device; the content of the screen of the device; media content being played by the device; and the standby state of the device.

The object may be a body part of a user of the device. For example, the object may be a hand of the user or a side of the user's head.

The acoustic input signal may be the signal received at the microphone during a measurement period.

The method may comprise controlling the duration between measurement periods and/or the length of the measurement period based on the information relating to the object. The measurement periods may be cycled whenever the device is switched on, such that the method is always active.

According to a second aspect of the invention, there is provided a chipset configured to enable a mobile communications device to perform the method of the first aspect.

The chipset could be provided to manufacturers of mobile communications devices for later inclusion in such devices. The chipset simply requires connections to the speaker, microphone and power source of the mobile communications device and is thus simple to implement. The chipset does not have to be dedicated to distance measurement, and can be provided to perform other functions related to the speaker and/or microphone (for example an amplifier).

According to a third aspect of the invention, there is provided a mobile communications device configured to perform the method of the first aspect.

The mobile communications device may comprise the chipset of the second aspect, or may be independently configured to perform the method.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
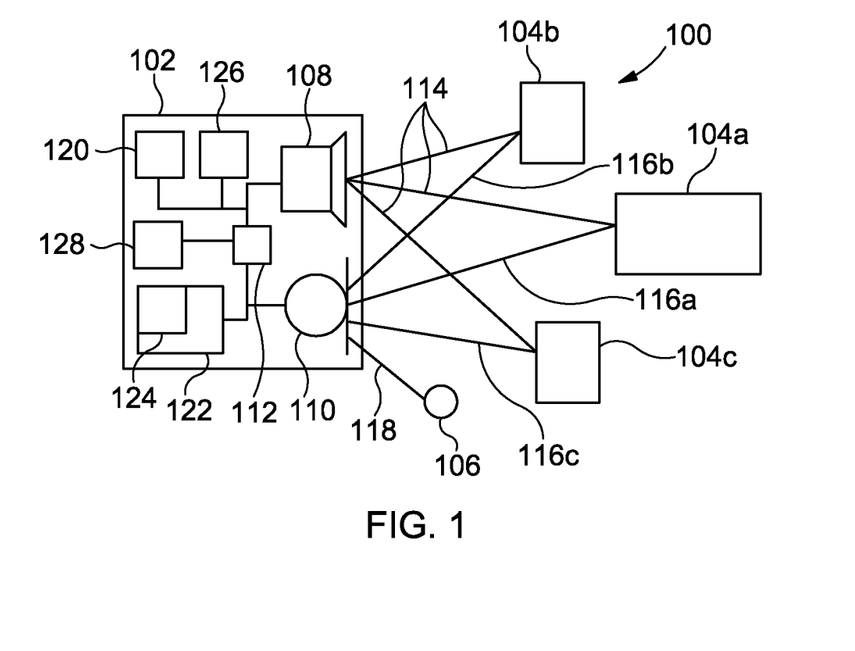
FIG. 1 illustrates an exemplary environment for explaining embodiments of the invention.

FIG. 1 shows an exemplary environment 100 which can be used to describe embodiments of the present invention. Within the environment 100, there is a device 102, a number of objects 104a, 104b, 104c and a number of sound sources, 106. It will be appreciated that FIG. 1 is provided as an example only, and embodiments of the invention may be carried out in environments 100 with any number of objects 104 (for example one or more), any number of sound sources (for example none or more) and any number of devices 102.

The device 102 includes a speaker 108 and a microphone 110 coupled to a controller 112 of the device 102. The controller 112 of the device 102 can cause the speaker 108 to emit a reference signal 114. The reference signal 114 can be reflected off the objects 104a, 104b, 104c to give reflected signals 116a, 116b, 116c. The reflected signals 116a, 116b, 116c are then picked up by the microphone 110. The microphone also detects any signals 118 emitted by the sound sources 106.

It is possible to determine the distance between the device 102 and a selected one of the objects, for example the first object 104a, based on the measured time of flight between the reference signal 114 being emitted by the speaker 108 and the relevant reflection 116a being detected by the microphone.

Figure 2:
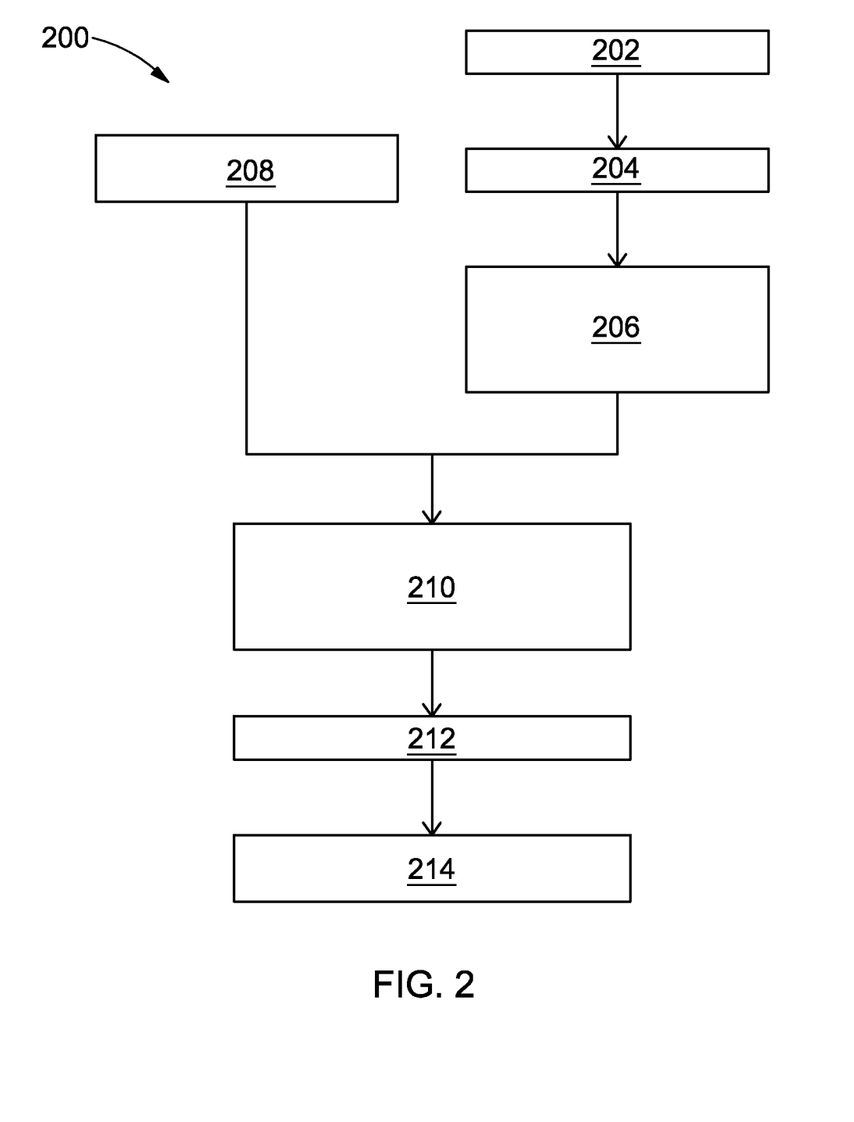
FIG. 2 is a flow chart illustrating a method for determining the distance between a device and an object.

FIG. 2 shows a method 200 of determining the distance between the device 102 and an object 104a.

At a first step 202, the reference signal 114 is emitted by the speaker 108 of the device 102.

Figure 3:
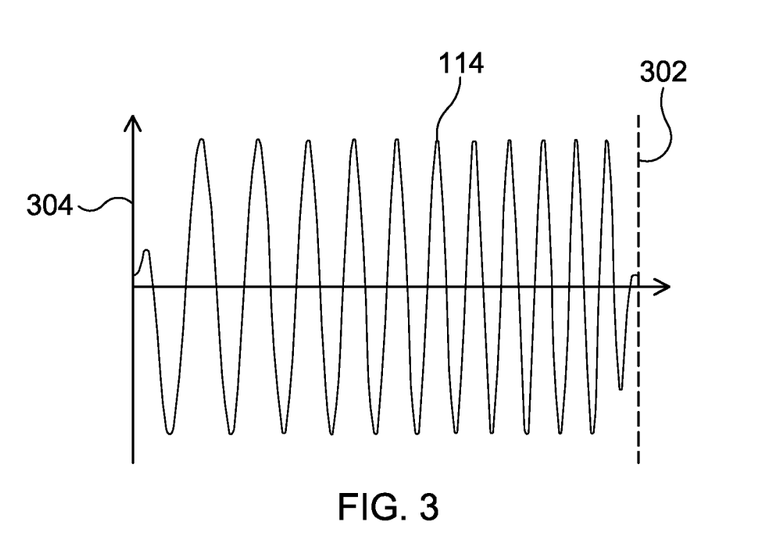
FIG. 3 illustrates an exemplary reference signal for use in the method of FIG. 2.

FIG. 3 shows one example of a reference signal 114 that may be used, as a function of time. In this case, the reference signal 114 is a pulsed sine up-chirp. The pulsed sine chirp starts at a pulse start time 302 with an initial frequency and ends at a pulse end time 304, with a final frequency. Over the duration of the pulse the frequency gradually increase from the initial frequency to the final frequency.

Figure 4A:
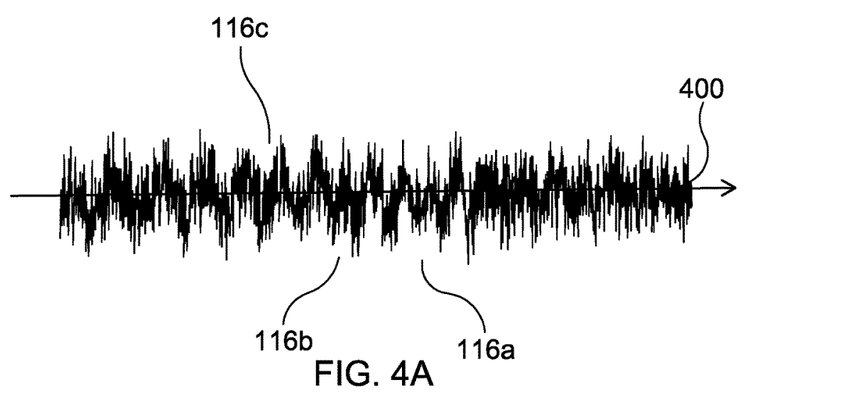
FIG. 4A illustrates an exemplary input signal received in the method of FIG. 2.

At a second step 204 of the method 200, sometime after emission 202 of the reference signal 114, an input signal 400 is received at the microphone 110 of the device 102. FIG. 4A shows an example of an input signal 400 that may be received, when the reference signal 114 is as shown in FIG. 3. The signal 400 is also shown as a function of time.

The input signal 400 may include several different components. For example, there may be components 116a, 116b, 116c resulting from reflection of the reference signal 114 off different objects 104a, 104b, 104c. The input signal 400 may also include components 118 resulting from noise sources 106, and additional noise components from audio and electrical noise.

The region of the input signal 114 corresponding to the reflections 116 of the reference signal 114 is the area of interest for determining the distance to an object 104. This region of the input signal 114 can be considered a measurement portion and can be defined in either the time or frequency domain, as will be discussed in more detail below.

Figure 4B:
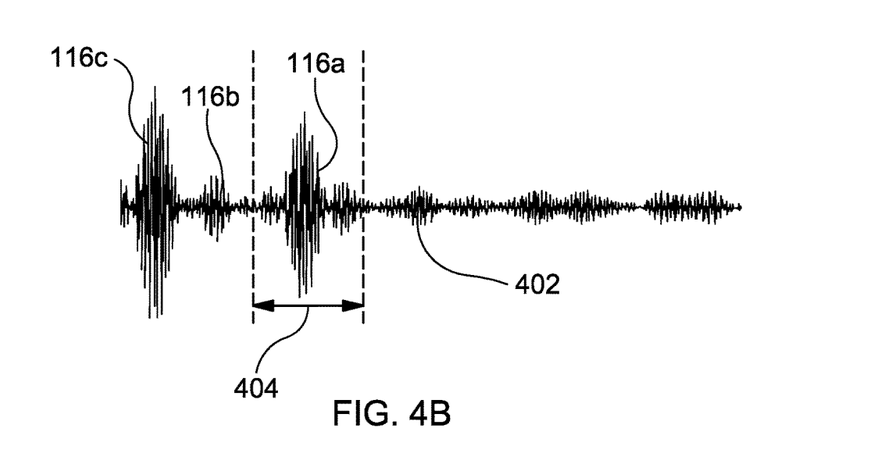
FIG. 4B illustrates an exemplary cross correlated signal obtain by cross correlating the signals in FIG. 3 and FIG. 4A.

Next, the input signal 400 is cross correlated with the reference signal 114 at step 206. FIG. 4B illustrates the cross correlated signal 402 resulting from cross correlating the exemplary input signal 400 of FIG. 4A with the exemplary reference signal 114 of FIG. 3.

Cross correlation of two signals is a measure of how similar the two signals are. Therefore, where the cross correlated signal has high amplitude, the input signal 400 is a close match to the reference signal 114. Therefore, these regions are likely to correspond to the reflections 116 of the reference signal 114 by the objects 104.

The method 200 is concerned with finding the distance between the device and a selected one 104a of the objects 104. At a step 208, information relating to the selected object 104a is received. The information is separate to any information received in the input signal 400 and enables a section 116a of the input signal 400 that corresponds to reflection of the reference signal 114 off the selected object 104a to be identified. This section 116a can then be extracted from the signal 400 at method step 210 for further processing. Extracting the section 116a corresponding to reflection from the object 104a should remove sections 116b, 116c corresponding to reflection from any other objects 104b, 104c.

The information relating to the object is required for method step 210, but can be received any time before that step occurs. This means that the information can be received between, before, after or simultaneously to the earlier steps 202, 204, 206 of the method 200.

At step 212, after the section 116a of the input signal 400 that corresponds to reflection of the reference signal 114 off the selected object 104a has been extracted, the section 116a is analysed to determine an accurate time of flight ($t_{acc}$) from the speaker 108, off the object 104a, to the microphone 110.

At a final step 214, the accurate time of flight is used, together with the speed (c) of the signal 114 (which is known since the signal is generated by the controller 112) to determine the distance (d) from the device 102 to the object 104a. The distance is calculated according to:

$$d = 0.5 \times c \times t_{acc} \tag{1}$$

Figure 4C:
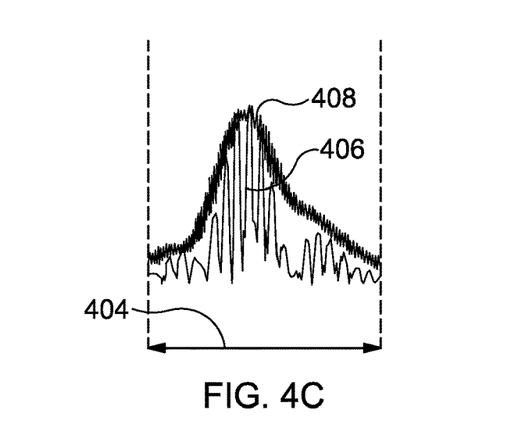
FIG. 4C illustrates exemplary rectified and envelop signals from the window in FIG. 4B.
Figure 7:
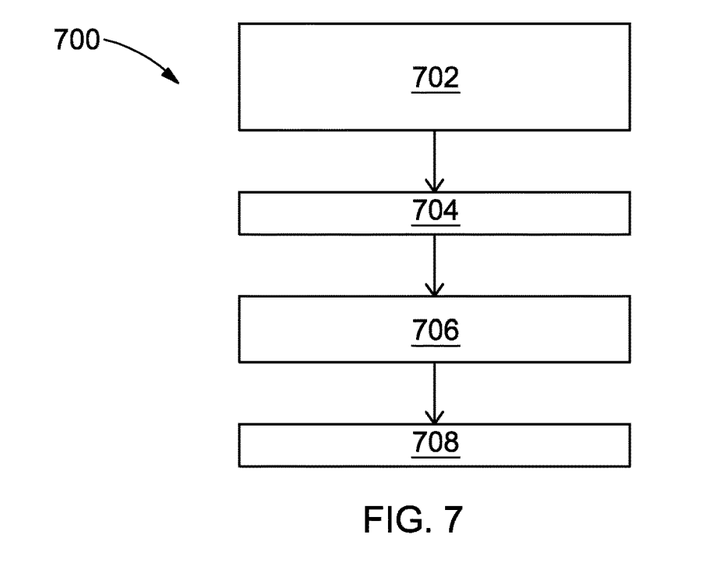
FIG. 7 is a flow chart illustrating a method of determining the time of flight of the signal.

FIG. 7 shows one example of a method 700 of analysing the extracted section 116a of the cross correlated signal 402 to determine an accurate time of flight (step 212). At a first step 702, the signal is rectified to provide a rectified signal 406, as shown by the narrow line in FIG. 4C. The signal is then filtered in a second step 702. The filtering removes any high frequency noise present using a low pass filter, and serves as an envelope detection step 704, providing a correlation amplitude envelope 408, shown as the thick line in FIG. 4C.

At step 706, the correlation amplitude envelope 408 is analysed to find a characteristic time of the correlation amplitude envelope 408 and at step 708, the time of flight is found as the time difference between the characteristic time of the correlation amplitude envelope and the time at which the reference signal 114 was emitted.

In one example, the characteristic time may be found by finding the centre of gravity of the signal. In this situation, the step of envelope detection 704 is optional, and may be omitted entirely and the rectified signal 406 or correlation amplitude envelope 408 may be used.

The centre of gravity of a signal can be conceptually thought of as the point at which a 2D model of the signal would perfectly balance. For the purposes of determining the time of flight, only the time (x-co-ordinate) of the centre of gravity is needed.

The centre of gravity is useful because its position is less susceptible to movement due to noise than, for example, the peak. Consider, for example, an asymmetrical curve representing a value to be measured, with noise on the value. The curve has a gradual climb on one side of the peak and a sharp drop the other side of the peak. The noise means that the true value is part way up the gradual climb. Detecting the peak will return a value that is shifted from the true value by more than the centre of gravity is. For a fully symmetrical curve, the peak occurs at the centre of gravity.

In other examples, it may be sufficient to use a simple peak detection algorithm to find the characteristic time. In this situation, both the rectification 702 and envelope detection 704 steps may be omitted, only one of these steps may be used or both of these steps may be used. In yet more examples, other characteristic times may be used as the characteristic time.

In general, the time of flight is the time by which the reference signal 114 needs to be shifted to match the recorded signal, i.e. to generate the peak in the correlation signal. The time at which the reference signal 114 was emitted may be considered in any suitable way. It may be the time at which the pulse started, ended, the mid-point of the pulse, the time of a particular feature in the signal, or it may be calculated using the centre of gravity or peak of the reference signal 114.

The final two steps 706, 708 of the method 700 of FIG. 7 form part of analysing the section 116a extracted from the cross correlated signal 402 to determine an accurate time of flight. The steps of rectification 702 and envelope detection 704, if used, may be provided at any point after cross correlation (at step 206) and before the time of flight is determined (at step 212). Accordingly, the step 210 of extracting the section 116a of the cross correlated signal 402 may be carried out directly on the cross correlated signal 402, on the rectified signal 406, or on the correlation amplitude envelope 408. Furthermore, the steps of rectification 702 and envelope detection 704 may be separated by the extraction step 210.

The time of flight may also include systematic portions resulting from time delayed reflections and delays in the device 102. The delays in the device 102 may result from delays between generating the reference signal 114 and emitting it and delays between receiving the measurement signal 400 and recoding it for the later processing stages. These delays can be determined and then deducted from the accurate time of flight. Where envelope detection 704 is used, the filtering required to provide the envelope introduces a further delay (i.e. the peak of the envelope is slightly later than the peak of the "raw" data) that requires correction.

There are many ways these delays could be determined, as would be appreciated by a person skilled in the art. For example, the delay could be measured periodically. Alternatively, it could be continually measured. In another example, the delay could be measured during commissioning of the device 102 (or calculated based on theoretical assumptions) and stored as a fixed parameter to be used.

The signals 114, 400, 402, 406, 408 shown in FIGS. 3, 4A, 4B and 4C are shown by way of example only and different signals may be used or received. It will be appreciated that a large part of the input signal 400 and cross correlated signal 402 derives from the form of the reference signal 114.

To obtain a cross correlated signal 402 that is useful for determining the distance to the first object 104a, it is desirable that the reference signal 114 exhibits good auto-correlation properties. Autocorrelation is a measure of how well a signal correlates with an earlier or later version of itself. The degree of auto correlation can be described by a correlation coefficient, which, when normalised, varies between 0 and 1 (1 representing perfect correlation). The level of auto correlation required is dependent on the level of accuracy required and the how noisy the surrounding environment is. For any application, the auto correlation peak should be easily identifiable over the noise. As greater accuracy is required, a higher correlation coefficient is required.

The auto correlation properties of the reference signal 114 are needed because it allows for easy identification of the reflections 116 and easy differentiation of the reflections 116 from noise.

The sine up-chirp shown in FIG. 3 is one example of a reference signal with good auto correlation. However, any signal that exhibits the desired auto-correlation properties may be used. Other examples of signals that may be used include: sine down-chirps; combined up-chirps and down-chirps; frame synchronization words; CAZAC signals; maximum length sequences, white noise and non-white noise. In this context, the term white noise indicates full bandwidth noise, with an auto correlation coefficient of 1 for no time delay, and ~0 for any non-zero time delay, whilst non-white noise indicates noise in which at least some of the frequency band-width is removed (e.g. by filtering) to give "coloured" noise.

In the above, the reference signal 114 has also been described as a pulsed signal. Using a pulsed signal means that energy usage is reduced compared to a continuous signal. However, it is not essential to pulse the reference signal 114, and a continuous wave reference signal 114 can also be used.

Any suitable frequency range may also be used for the reference signal 114. In some examples, the reference signal may be to the human ear inaudible (for example, ultrasonic).

It is generally assumed that humans can hear in the range between 20 Hz and 20 kHz, therefore the signal may be made inaudible by generating a signal at frequencies over 20 kHz. In other examples, reference signals including audible components (for example white noise) may be filtered to remove audible components (for example high-pass filtering, which would "colour" the noise). A time window (for example a Hamming window) can also be applied to pulsed reference signals 114 to reduce the audible impact of the on/off switching of the pulse.

In other examples, the reference signal may be audible.

As discussed above, the information relating to the object 104a enables identification of the section 116a of the cross correlated signal 402 corresponding to reflection of the reference signal 114 from the object 104a. In one example, the information includes an estimated distance ($d_{est}$) to the object and this used to calculate an approximate time of flight $t_{approx}$ of the signal.

The section 116a of the cross correlated signal 402 corresponding to reflection from the object 104a is then extracted by only taking the section 116a of the cross correlated signal 402 received within a time window centred on the estimated time of flight after the reference signal 114 was emitted. FIG. 4B illustrates an example of a window 404 that may be used to extract the region 116a corresponding to reflection off the first object 104a.

Proper selection of the time window means that the sections corresponding to all other reflections 116b, 116c are removed, and there is still sufficient data to process to determine the accurate time of flight and hence determine the exact distance, which is significantly more accurate than the estimated distance. It will be appreciated that the size of the exact time window will depend on the length of the reference signal (the length of the reference signal plus an uncertainty margin).

The information may also include other information about the device that may be useful in determining the approximate time of flight and/or for other applications (see below). This may be, for example, an angle of the object 104a relative to the speaker 108 and microphone 110, a size of the object 104a or the reflection properties of the object 104a.

The information relating to the object 104a can also be used to control the exact nature of the reference signal 114, although this is not essential. There are a number of parameters of the reference signal 114 which may be varied, such as: signal type, pulsed or continuous, pulse duration (if pulsed) initial frequency, final frequency, intermediate frequencies and sweep time (if there is a frequency sweep), signal loudness.

In addition to the information received in step 208, contextual information may also be to control the reference signal 114. For example, the desired accuracy for a particular application, or information detected by the device such as if the surrounding environment is very noisy, can also be used.

When controlling the exact nature of the reference signal 114, it may be important to strike a balance between the performance of the method 200 and the power consumed. For example:
 Pulse duration: for longer duration reference signal 114 pulses, the reflection 116a is easier to detect in noise, but more speaker power and processing time will be required. This can be used for, for example, noisy environments, distant objects or small objects.
 Frequency bandwidth: a wider frequency bandwidth reference signal 114 will have better autocorrelation and thus more accurate distance measurement. The distance measurement will also be more robust against frequency-dependent attenuation of the signal (either in speaker 10 or microphone 110 themselves or due to multipath propagation effects). However, a wider frequency bandwidth will increase power consumption.
 Pulse loudness: the louder the pulse, the easier it becomes to be detect reflections and the larger the potential distance range of detection becomes. This can also be used to detect smaller objects. However, loudness immediately couples to power consumption.

Figure 5:
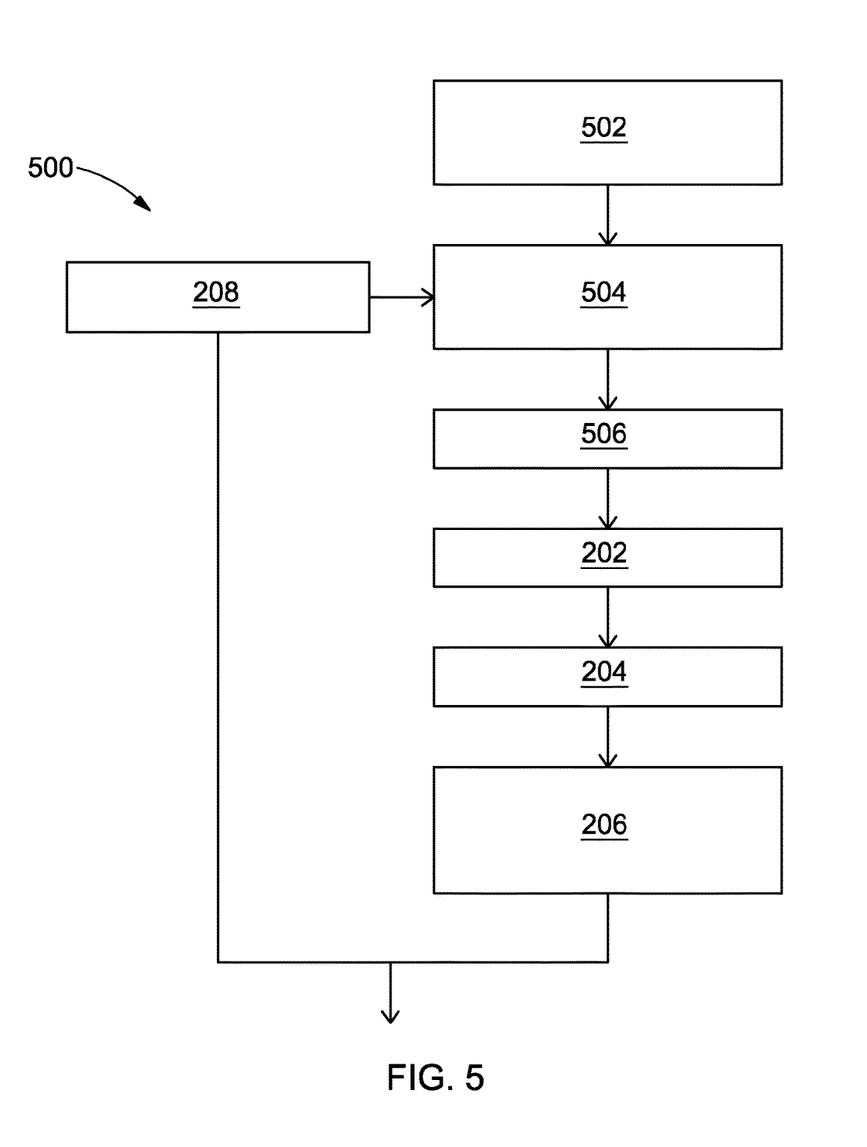
FIG. 5 is a flow chart illustrating a method of controlling the reference signal based on known information about the target and/or context of the method.

FIG. 5 illustrates a method 500 of controlling the reference signal 114 based on the information relating to the object and/or other information. The method 500 of FIG. 5 is intended to supplement the method 200 of FIG. 2, and where the steps of the method are the same, the same reference numerals are used.

As a first step, the information relating to the object 104a is received 208 and/or information about the context (for example required accuracy, noise conditions etc.) is received 502.

Based on the information received, the optimum parameters for the reference signal 114 (bearing in mind the desire to minimise power consumption) are determined at step 504. This will balance the requirements of the method and the requirements of reduced power consumption. The reference signal is then generated according to these parameters at step 506. The method then proceeds with emission of the signal 202, and further steps as described above.

The information relating to the object can be received in any number of ways. For example, the information may be "a priori" information that is stored and retrieved from a memory 120 of the device 102. It may also be received in a transmission to the device 102, over a wired or wireless transceiver 128. Alternatively, it may be received as an input from the user, through a user interface 126 (such as a keypad or touchscreen).

Any suitable information that allows the approximate time of flight to be determined may be used. In one example, the user may simply enter an estimate of the distance to the object 104a through the user interface.

Figure 6:
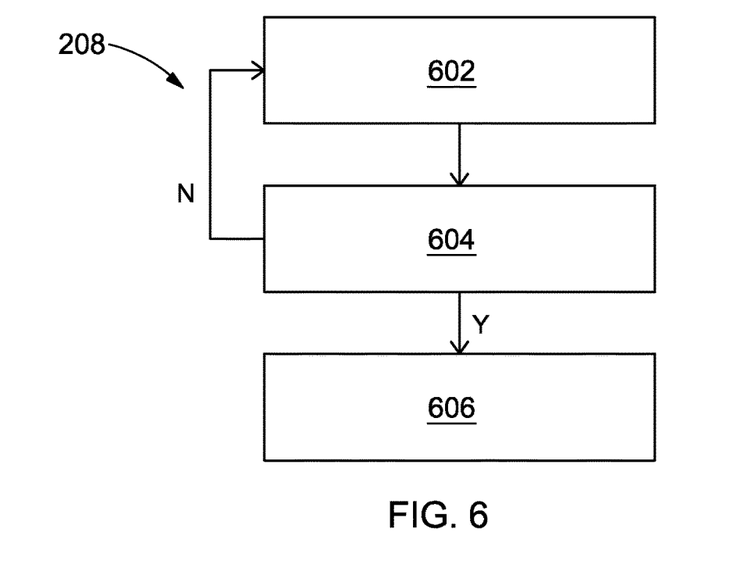
FIG. 6 is a flow chart illustrating a method of receiving information about the device.

FIG. 6 shows another example of a method for receiving information 208 relating to the object 104a. In this example, the device comprises a camera 122 having an autofocus module 124. An image captured on the camera is displayed on a screen of the user interface 126, and at a first step 602, the autofocus unit focuses on a candidate object 104a. The candidate object 104a can be selected by an automated process or by a user indication.

At a second step 604, the user indicates whether or not the candidate object is the object they would like to measure the distance to. If it is not, the method returns to step 602 and a new object is selected. If the object is correct, the method proceeds to step 606, where the autofocus unit 124 determines an approximate distance to the object 104a. The approximate distance is then provided as the information relating to the object 104a.

Processing (and hence power) requirements can be further reduced by optionally including the step of extracting the measurement portion from the input signal 400, before cross correlation occurs (step 206). Calculating the correlation is the most computationally expensive step in the method 200. Therefore, in some example, the cross-correlation is performed on as short as possible time window (the measurement portion). The time window should not be longer than the length of the reference signal plus any uncertainty on the time delay before the measurement.

The measurement portion can be extracted by, for example only taking a certain time portion of the measured signal. This can lead to two separate stages of time windowing, the first stage being performed on the measured signal and the second stage on the correlated signal, based on the approximate time of flight, as discussed above.

In some examples, extracting the measurement portion may be based on the estimated time of flight. In these examples, extracting the measurement portion may extract only the reflection 116a from the object 104a that the distance is being calculated to. In these examples, further extraction of the reflection from the cross correlated signal may not be required.

In some examples, the input signal 400 may also be filtered to remove any frequencies lower and/or higher than the reference signal 114 (high pass filtering, low pass filtering or band pass filtering). This may increase processing requirements but improves robustness against noise.

In some examples measurements are only taken within a predefined period, some time after the reference signal has been emitted (measurement windows). The measurement windows can be repeated on a cycling basis. The input signal may be considered as the same as the measurement portion in this situation.

It is also possible to use a combination of filtering and time windowing. In this situation, the input signal may be the signal received in the measurement window, and any extraneous noise can be removed by filtering.

In another example, the measurement portion may be extracted by matching the known pattern of the reference signal 114 with similar regions in the measurement signal 400, using matched filtering.

In examples with measurement windows, the duration and separation between measurement windows may be controlled based on the estimated time of flight. For example, if the method 200 is intended to detect objects 104 within a certain range, the measurement window may be limited to the time taken for reflections from objects within that range.

In one example, the measurement window may start at a first time and end at a second time. The first time may be the time at which the reference signal 114 is emitted. Alternatively, there may be some delay between the time the reference signal 114 is emitted and the start of the measurement window. The delay may be based on the minimum expected distance of objects 104 from the device 102, so that reflections 116 from closer objects are not sensed. For example, the measurement window may start just before reflections would be expected to arrive from objects 104 at the minimum expected distance. Similarly, the second time may be based on the maximum expected distance of objects 104.

For example, it may be that the device 102 is only interested in objects between one and two meters away. The reference signal is emitted at a time t, the measurement window starts shortly before the reflection from an object at one meter would be expected and ends shortly after the reflection from an object at two meters would be expected. Any reflections from closer or farther objects, or signals arriving outside the time window are not recorded for later processing. The method may work for objects up to ten meters away or further, or objects directly adjacent the device.

The timing of the measurement windows and pulses of the reference signal 114 can also be used to make the system scalable to a large number of devices 102 working in the same area. By ensuring that the measurement windows for each device are offset, the chances that a first device 102a will receive the reference signal 114 directly from a second device 102b, and treat it as a reflection of its own reference signal 114 is extremely low. This can be further improved by using different reference signals 114 for each device 102, so that the reference signal is specific to each device 102.

It may also be possible that a device 102 receives its own reference signal 114 at the microphone 110 directly from the speaker 108, without reflection. This may be, for example electrical crosstalk between the speaker 108 and microphone 110 wires or internal acoustical coupling inside the device, not related to external echoes or reflections 116. This signal will also be considered as noise, and should be removed from the measurement signal 400. This can be measured as a component that is invariant with changing distance to the object, or as a component when there are no reflections, and removed from the signal.

Figure 8:
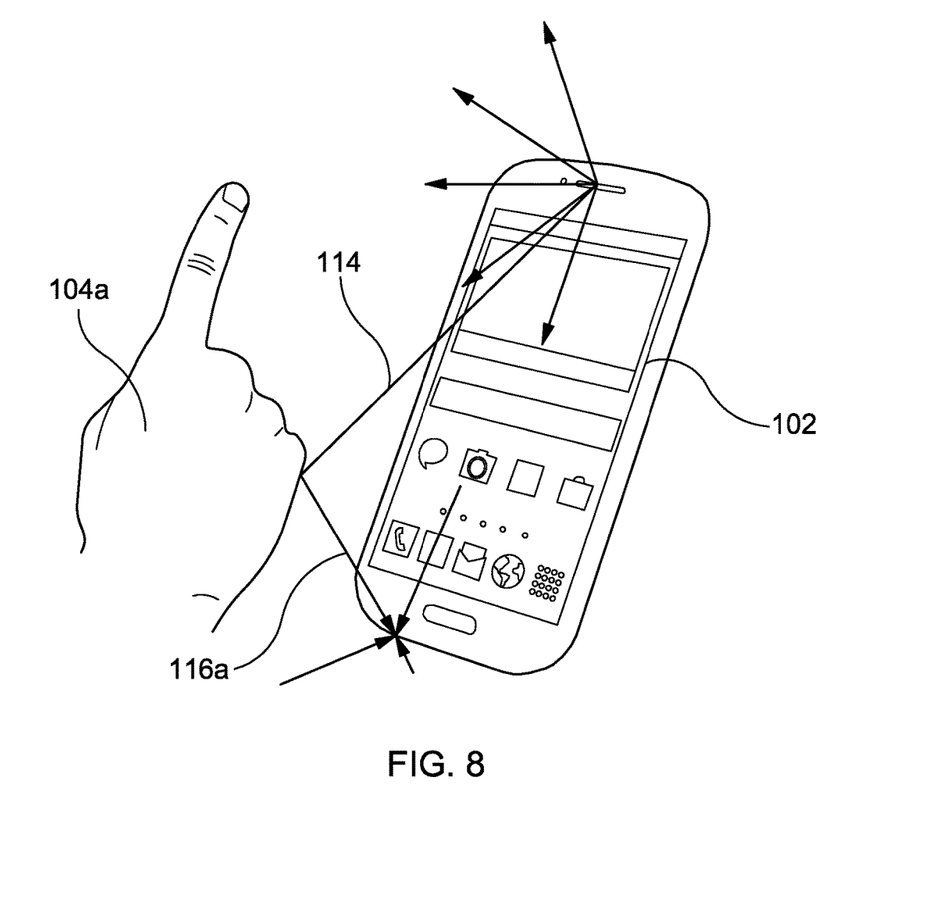
FIG. 8 illustrates an example application for using the distance measured by the method of FIG. 2.

In one example, the device 102 may be a mobile communications device, such as a mobile phone (including, but not limited to smart phone, PDA, tablet computer) as illustrated in FIG. 8. The speaker 108 and microphone 110 used for determining the distance are the same speaker 108 and microphone 110 as used for, for example, making voice calls, playing media content, controlling the device through voice commands.

Power consumption and space are two important requirements in a mobile device 102. Therefore, the method, which uses existing components, and which can be adjusted to reduce power consumption, can be useful.

The power consumption of the method 200 may be sufficiently low that the measurement periods can be continuously cycled, such that the method is always on when the device is not in a low power mode. For example, the method 200 may be active when other applications of the device (e.g. map display, music player) are on.

In other examples, despite the low power consumption, the method may require activation, for example, as an application on the mobile communications device.

The method 200 for determining the distance between an object 104a and the device 102 can be run simultaneously to other applications of the device, for example, voice communications. To achieve this, a number of steps can be taken:
 If the speaker 108 is required to play audio in addition to the emitting the reference signal, then the method can include a step of mixing the audio with the reference signal 114, before emitting the mixed signal. In such examples, the reference signal 114 may be inaudible, whilst the audio may be audible and so there will be limited interference.
 Sections of the signal 400 received at the speaker 110 may be extracted and provided for separate use by different applications of the device 102. In the example of voice communications, the sound source 106 of FIG. 1 may be the mouth of the user. In this case, the sound generated by the user 118 could be extracted in a similar way to the measurement portion, and, for example, sent over the transceiver 128.

The measured distance and/or changes in the measured distance can be used to control the behaviour of the device. In the example shown in FIG. 8, the user moving their hand 104a closer or further from the device 102 may increase or decrease the volume.

In examples such as this, using the peak of the correlation amplitude envelope may allow differentiation between the movement of different fingers, whilst using the centre of gravity may mean that only the hand is used, so that small, unintentional movement of the fingers does not cause false readings.

In another example, the object 104a may be the side of the user's head or ear. In this way, as the device is moved further or closer from the user's head, the volume of the speaker 108 increases or decreases, improving the quality of the voice call experience for the user. The measurement of the distance between the user's head and the speaker 108 may also be used for adaptive equalisation of the speaker 108 output. For example, when the speaker 108 is closer to the head, the low-frequency acoustical coupling becomes better and the more low-frequency content is boosted. This can be compensated for by attenuating the low frequency components in the acoustic signal when the speaker 108 is close to the ear of the user.

Any controllable behaviour of the device may be controlled by the distance measurement. For example, the distance measurement may be used to control zoom, the content of the screen, the media being played by the device, whether the device is on, off or in standby mode.

The method 200 may also be used to control behaviour of other types of device such as televisions, and the like.

It will be appreciated that in the above, any reference to a speaker 108 is intended to cover any component that can generate sound waves and any reference to a microphone is intended to cover any component that can detect sound waves. Further, it will be appreciated that the speaker, 108, microphone 110 and controller 112 may be in separate housings and/or separate devices, although the speaker 108 and microphone 110 should either be located in close proximity to one another or in a known arrangement. The controller may be wholly or partly implemented as a process or solid state components on a chip, and may be part of the device or, alternatively, any of the signals may be transmitted to a remote controller by the transceiver 128.

It will also be appreciated that in the above, any reference to "noise" refers to any information on the input signal 400 that does not result from the reflection 116 of an emitted reference signal 114, even if this signal is for use in other applications (for example, voice).

The method may be implemented by a separate chip or chipset that can be provided into the phone. The chip or chipset may be primarily provided for alternative purposes, such as amplification or the like. Alternatively, the method may be implemented by other components of the device/phone.

From reading the present disclosure, other variations and modifications will be apparent to the skilled person. Such variations and modifications may involve equivalent and other features which are already known in the art of signal analysis and mobile communications devices, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of determining a distance between a device and an object, the method comprising:
   emitting an acoustic reference signal from a speaker of the device;
   receiving an acoustic input signal at a microphone of the device, the acoustic input signal including a measurement portion including a reflection of the acoustic reference signal off the object;
   cross correlating at least the measurement portion with the emitted acoustic reference signal to provide a cross correlated signal;
   receiving estimated time of flight information relating to the object;
   extracting a section of the cross correlated signal corresponding to the reflection of the acoustic reference signal by the object, based on the received estimated time of flight information;
   analyzing the extracted section of the cross correlated signal to determine a time of flight between emitting the acoustic reference signal and receiving the reflection wherein analyzing includes detecting a center of gravity of the extracted section of the cross correlated signal, determining a time of the center of gravity of the extracted section of the cross correlated signal, and determining a time of flight based on a time difference between the time of the center of gravity of the extracted section of the cross correlated signal and a first time at which the acoustic reference signal was emitted; and
   determining the distance between the device and the object based on the determined time of flight and known characteristics of the acoustic reference signal.

2. The method of claim 1, wherein emitting the acoustic reference signal further comprises:
   mixing the acoustic reference signal with a primary acoustic signal to be emitted by the speaker to form a mixed signal; and
   emitting the mixed signal.

3. The method of claim 1, wherein the acoustic reference signal is pulsed or continuous and the known characteristics of the acoustic reference signal comprise one or more of a constant frequency or frequency sweep details, a signal loudness, a pulse duration, and an exact form of the signal.

4. The method of claim 3, further comprising:
   processing the acoustic input signal to extract the measurement portion.

5. The method of claim 4, wherein processing the acoustic input signal to extract the measurement portion further comprises:
   filtering the acoustic input signal to identify regions of the acoustic input signal having similar characteristics to the acoustic reference signal; and
   extracting these regions as the measurement portion.

6. The method of claim 3 comprising:
   controlling one or more of the characteristics of the acoustic reference signal based on the received estimated time of flight information relating to the object.

7. The method of claim 1, wherein the received estimated time of flight information relating to the object comprises information enabling determination of an approximate arrival time of the reflection of the acoustic reference signal off the object, after emission of the acoustic reference signal at the first time.

8. The method of claim 7, wherein extracting the section of the cross correlated signal corresponding to the reflection of the acoustic reference signal by the object further comprises:
   extracting the section of the cross correlated signal corresponding to a section of the acoustic input signal received during a time window centered at the approximate arrival time.

9. The method according to claim 1, wherein analyzing the extracted section of the cross correlated signal to determine the time of flight further comprises:
   rectifying the extracted section of the cross correlated signal to provide a rectified signal;
   detecting a center of gravity of the rectified signal;
   determining a time of the center of gravity of the rectified signal; and
   determining a time difference between the time of the center of gravity of the rectified signal and the first time at which the acoustic reference signal was emitted.

10. The method according to claim 1, wherein the measurement portion comprises a component corresponding to direct coupling from the speaker to the microphone, and the method further comprises:
    removing the section corresponding to direct coupling from the measurement portion.

11. The method of claim 1, wherein the received estimated time of flight information relating to the object is received from a user input at a user interface of the device.

12. The method of claim 11, wherein the user input confirms the object on a display of the device or indicates an approximate distance to the object.

13. The method of claim 1, wherein the device is a mobile communication device and the speaker and microphone are primarily for voice communication via the mobile communication device, the method further comprising:
    controlling at least one behavior of the mobile communication device based on the determined distance.

14. A chipset including instructions fixed in a non-transitory tangible medium configured to enable a mobile communications device to determine a distance between the mobile communications device and an object, the non-transitory tangible medium comprising:
    instructions for emitting an acoustic reference signal from a speaker of the mobile communications device;
    instructions for receiving an acoustic input signal at a microphone of the mobile communications device, the acoustic input signal including a measurement portion including a reflection of the acoustic reference signal off the object;
    instructions for cross correlating at least the measurement portion with the emitted acoustic reference signal to provide a cross correlated signal;
    instructions for receiving estimated time of flight information relating to the object;
    instructions for extracting a section of the cross correlated signal corresponding to reflection of the acoustic reference signal by the object, based on the received estimated time of flight information;
    instructions for analyzing the extracted section of the cross correlated signal to determine a time of flight between emitting the acoustic reference signal and receiving the reflection wherein analysing includes detecting a center of gravity of the extracted section of the cross correlated signal determining a time of the center of gravity, and determining the time of flight based on a time difference between the time of the center of gravity of the extracted section of the cross correlated signal and a first time at which the acoustic reference signal was emitted; and instructions for determining the distance between the mobile communications device and the object based on the determined time of flight and known characteristics of the acoustic reference signal.

15. A mobile communications device including instructions fixed in a non-transitory tangible medium configured to determine a distance between the mobile communications device and an object, the non-transitory tangible medium comprising:

instructions for emitting an acoustic reference signal from a speaker of the mobile communications device;

instructions for receiving an acoustic input signal at a microphone of the mobile communications device, the acoustic input signal including a measurement portion including a reflection of the acoustic reference signal off the object;

instructions for cross correlating at least the measurement portion with the emitted acoustic reference signal to provide a cross correlated signal;

instructions for receiving estimated time of flight information relating to the object;

instructions for extracting a section of the cross correlated signal corresponding to reflection of the acoustic reference signal by the object, based on the received estimated time of flight information;

instructions for analyzing the extracted section of the cross correlated signal to determine a time of flight between emitting the acoustic reference signal and receiving the reflection, wherein analyzing includes detecting a center of gravity of the extracted section of the cross correlated signal, determining a time of the centre center of gravity, and determining the time of flight based on a time difference between the time of the center of gravity of the extracted section of the cross correlated signal and a first time at which the acoustic reference signal was emitted; and instructions for determining the distance between the mobile communications device and the object based on the determined time of flight and known characteristics of the acoustic reference signal.

16. The method according to claim 1, wherein analyzing the extracted section of the cross correlated signal to determine the time of flight further comprises:

generating a correlation amplitude envelope for the extracted section of the cross correlated signal to provide an amplitude envelope signal;

detecting a center of gravity of the amplitude envelope signal;

determining a time of the center of gravity of the amplitude envelope signal; and determining the time of flight based on a time difference between the time of the center of gravity of the amplitude envelope signal and the first time at which the acoustic reference signal was emitted.

\* \* \* \* \*